United States Patent
Baghdady (12)

(10) Patent No.: US 6,573,865 B1
(45) Date of Patent: Jun. 3, 2003

(54) METHOD AND APPARATUS FOR RADIO LOCATION

(76) Inventor: Elie J. Baghdady, 21 Overlook Dr., Weston, MA (US) 02193

( * ) Notice: Subject to any disclaimer, the term of this patent is extended or adjusted under 35 U.S.C. 154(b) by 981 days.

(21) Appl. No.: 09/028,063

(22) Filed: Feb. 23, 1998

Related U.S. Application Data

(62) Division of application No. 08/523,920, filed on Sep. 6, 1995, now Pat. No. 5,745,078, which is a continuation of application No. 07/767,883, filed on Sep. 30, 1991, now abandoned, which is a division of application No. 07/524,600, filed on May 17, 1990, now Pat. No. 5,084,709.

(51) Int. Cl.[7] ................................................. G01S 5/04
(52) U.S. Cl. ....................... 342/437; 342/442; 342/446; 375/148
(58) Field of Search ......................... 342/442, 432–434, 342/437, 446; 455/202; 375/200, 147, 148

(56) References Cited

U.S. PATENT DOCUMENTS

| | | | |
|---|---|---|---|
| 3,005,198 A | | 10/1961 | O'Meara |
| 3,725,938 A | | 4/1973 | Black et al. |
| 3,750,178 A | * | 7/1973 | Hulst .......................... 342/465 |
| 3,939,477 A | | 2/1976 | Green et al. |
| 4,490,829 A | * | 12/1984 | Van Etten .................... 375/200 |
| 4,513,249 A | * | 4/1985 | Baghdady .................... 327/356 |
| 4,809,012 A | * | 2/1989 | Tong ........................ 342/442 X |
| 5,084,709 A | | 1/1992 | Baghdady |

OTHER PUBLICATIONS

G. Redgment et al "Analysis Of The Performance Of Multi–Aerial Adcock Direction–Finding Systems" dated February 3, and revised Jun. 25, 1947, pp. 751–761.

* cited by examiner

*Primary Examiner*—Gilberto Barron
(74) *Attorney, Agent, or Firm*—Burns, Doane, Swecker & Mathis, LLP

(57) ABSTRACT

This disclosure relates to multi-element antenna clusters or arrays for the reception and transmission of radio waves for direction-finding, navigation aid and emitter and/or receiver location purposes. In particular, it relates to arrangements of multiple antennas whereby the direction of propagation (arrival or departure) of a wavefront is determined from a combination of the amplitudes of phasor (or total individual antenna output) differences between pairs of antennas, said arrangements being along certain geometrical patterns, such as a circle, an ellipse, a polygon, an open straight line, etc., with at least one longest dimension measuring more than one wavelength of the incident or departing wave. Although described in terms of electromagnetic waves and hence antennas as receiving sensors or radiators, this invention in reality applies to any other form of propagating waveborne energy, such as acoustic, ultrasonic, seismic, etc.

13 Claims, 4 Drawing Sheets

METHOD AND APPARATUS FOR RADIO LOCATION

This application is a divisional of application Ser. No. 08/523,920 filed Sep. 6, 1995 now U.S. Pat. No. 5,745,078, which in turn is a continuation of application Ser. No. 07/767,883 filed Sep. 30, 1991 (abandoned), which in turn is a divisional of application Ser. No. 07/524,600, filed May 17, 1990 now U.S. Pat. No. 5,084,709.

BACKGROUND OF THE INVENTION

This invention relates to multi-element sensor or radiator arrays for the reception or emission of propagating waveborne energy for the purpose of determining or communicating the direction of propagation of the wavefront, or for providing a navigation-aid beacon, or for determining the location of a distant emitter or of the sensing or receiving apparatus. In particular, it relates to arrangements in which the total phasor difference between the outputs of pairs of elements, rather than just the phase difference, is taken, its amplitude is detected, and the result is used to determine the direction information of interest. It also relates to arrangements in which both said amplitude and said phase difference are used.

Prior art arrangements of multiple sensor elements are well-known in which the direction information is obtained by first taking the phasor differences between the outputs of individual sensor elements. Such arrangements of four or more elements are as a matter of course around the perimeter of a circle of diameter that at most is substantially equivalent to one wavelength of the subject wave, and by deliberate and calculated design is intended not to exceed this maximum allowable extent. Such arrays are commonly referred to in the art as Adcock antennas, Adcock arrays or structures, or simply Adcocks. In such arrays, the outputs of diametrically separated antenna pairs are differentially combined, although other pairings have been suggested. This method of combining the outputs of two separated antennas is known to yield a phasor-difference signal whose amplitude carries the trigonometric sine of the phase-shift difference between said two outputs of separated antennas, and whose phase is free of any dependence on the direction of propagation of the signal wavefront. For spacing of up to no more than just one wavelength between two antennas whose outputs are differentially combined, the azimuth and elevation angles of the Poynting vector of the propagating wavefront can be calculated from the detected phasor-difference amplitudes of two or more pairs of antenna elements arranged around a circle. However, it is universally presumed in the prior art of Adcock arrays that an uncorrectable error due to spacing between antenna pairs results and renders the array outputs unusable for direction finding for signal frequencies at which the diameter of an Adcock array exceeds a wavelength. This limitation of the diameter to a wavelength or less condemns Adcocks to being small-aperture sensors, and to a severe limitation on achievable direction-finding instrument precision and system performance accuracy that are characteristic of small apertures.

It is therefore an object of this invention to avoid the limitations of a small aperture on instrumental precision and performance accuracy by arranging the discrete sensor or radiator elements around a circle with a diameter well in excess of one wavelength. It is well known that the greater the aperture (or the largest linear dimension, such as the length of a linear array, the diameter of a circular array, the major axis of an elliptical array, and so forth) of an array, the higher the precision and accuracy achievable in the use of the array to determine the direction of propagation of a wavefront.

In certain situations, directions of approach or departure are not all of equal likelihood or importance, certain sectors being favored over others for one reason or another. In certain other situations, mounting platform or space limitations allow greater extensions of the element separations in certain directions than in others, which would rule out arrangement of the discrete elements around circles of diameters equal to the longest available dimension.

It is therefore another object of this invention to determine the direction of propagation of a traveling wavefront from the phasor differences of the outputs of more than one pair of sensor or radiator elements that are arranged along noncircular patterns or rows that conform to specified directional preferences or to available space that lacks circular symmetry.

It is yet a further object of this invention when employing circular arrays of elements (i.e., discrete sensors or discrete radiators) to achieve the favoring of a particular sector of directions by deriving the direction to be determined within said sector from a combination of element-output phasor differences between nondiametrically separated pairs of elements that are symmetrically positioned relative to the axis of said sector, together with the phasor difference of the outputs of the pair of elements separated by the diameter along said axis.

One additional consideration addressed by the present invention is the fact that the successful determination of the direction of propagation of a signal wave from the amplitude of the phasor difference, or from the phase difference, between the outputs of two separated sensor elements is predicated in the prior art on said signal comprising, in the form it is found when intercepted, a filter-separable pure sinwave. While this condition is satisfied by most common signal types, there has more recently been a growing interest in suppressed-carrier spectrum-spread-carrier signals, such as wideband analog or digital FM (e.g., linear-ramp FM, high-deviation-ratio FM by random noise, frequency hopping spread-spectrum) and other (e.g., direct-sequence phase-reversal modulated) signals of all types that do not present a filter-separable discrete sinusoidal component on arrival.

It is therefore a further object of this invention to provide means for operating on spectrum-spread and suppressed-carrier signal outputs of elements in an array to derive therefrom sinusoidal-phasor differences and sinusoid-pair phase differences that correspond to what would be obtained if such sinusoid were present as a discrete spectral line in said signal on arrival.

These and other objects and features of this invention will become apparent from the claims, and from the following description when read in conjunction with the accompanying drawings.

DETAILED DESCRIPTION

Figure 1A:
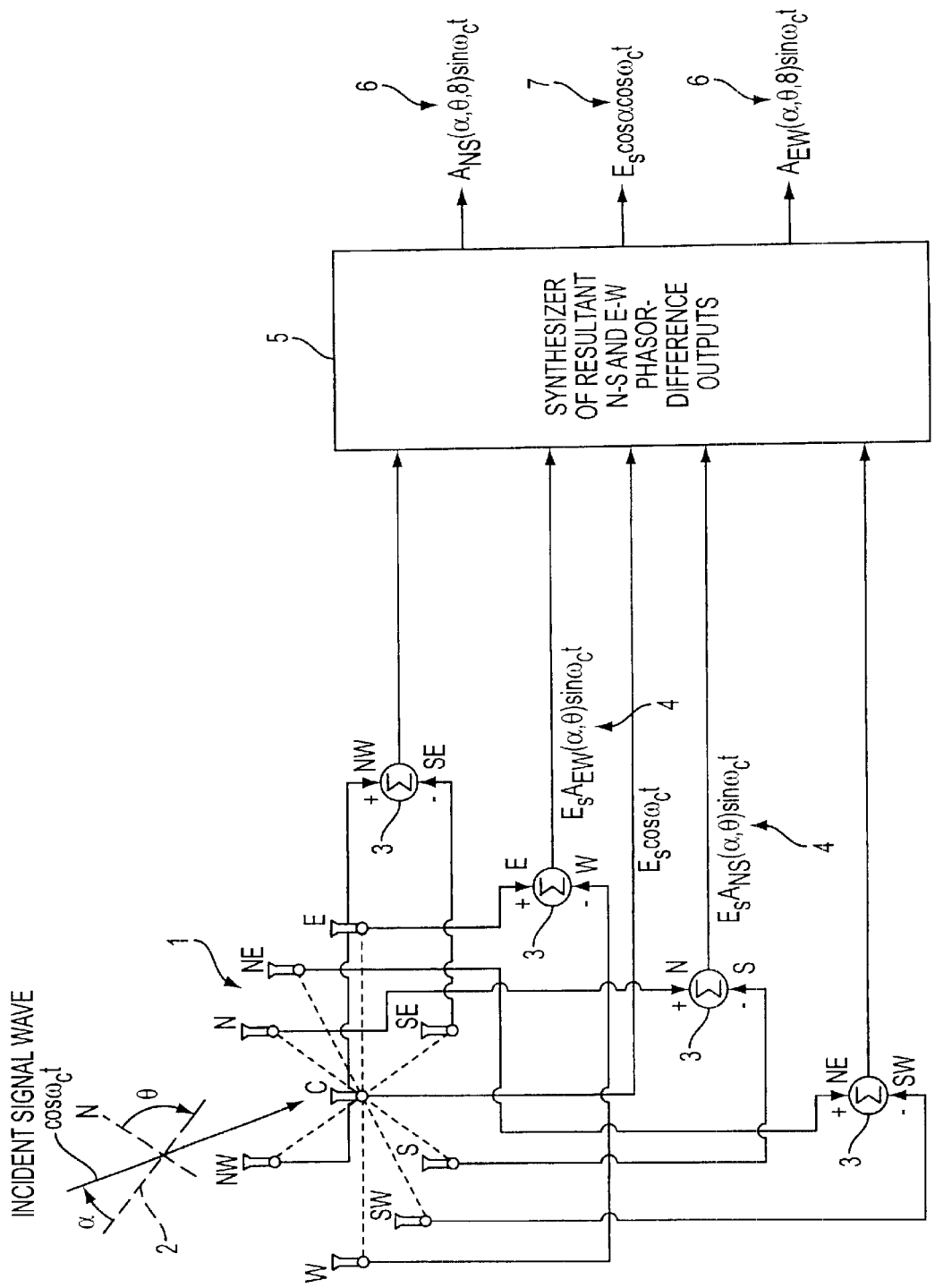
FIG. 1 illustrates receiving structures that feature the major functional components of Adcock-type signal receiving and processing preparatory to the determination of direction-of-arrival of an incident wavefront.

With reference to FIG. 1, it is well-known that an Adcock array consists of a number of separate antenna elements, 1 (designated N, E, S and W, for a four-element array, plus others in between, for a higher-order array, in FIG. 1a), that are arranged with uniform spacing around a circle of diameter restricted to well below one wavelength of the signal wave for which it is to be used, for a low-order (8-element or less) array, and to nominally one wavelength, for a higher-order (more than 8-element) array, wherein the outputs of diametrically opposed pairs of antennas are subtracted one from the other, by means 3, to obtain their phasor differences 4, which are then passed on via 5, or 8, 9 and 10 to amplitude detection means followed by direction-determination processing means. Direction finding based on such arrays is plagued with low precision and accuracy characteristic of the very small aperture (diameter) necessary to ensure very approximately linear dependence of the amplitudes of the resultant N-S and E-W phasor-difference outputs upon the cosine and sine of the azimuth of arrival, and hence negligible spacing errors.

Increasing the diameter of the array circle from less than a quarter of a wavelength up to one wavelength is made possible by increasing the number of elements in the array (i.e., the order of the array). The direction-dependent amplitude patterns of the phasor-difference outputs of pairs whose connecting axes are offset relative to one another combine to fill out one another's pattern major lobe fall-off with angle away from their respective axes as the diameter of the pattern circle is increased, thereby reducing the error in direction determination due to increased spacing between antenna pairs. At a value of the spacing equal to about 1.22×wavelength, a catastrophic breakdown in direction determination is experienced, expressible by an irreducible error due to spacing. Prior art practice has been firmly based on the assumption that the 1.22 wavelength spacing represents an absolute upper bound on the diameter of an Adcock array beyond which such an array becomes unusable. It will be shown in this disclosure that said prior art assumption is invalid, and that Adcock-type (henceforth, A-type) arrays of circular as well as noncircular forms including separations between paired antennas in excess of said prior art Adcock-array limit will provide direction-finding performance precision and accuracy that are superior to those realizable with prior art Adcock arrays. Moreover, the magnitude of the irreducible error at the breakdown values of antenna spacing is $\pi/2$ rad, and it can be calibrated out.

The mechanism by which an increase in the Adcock array diameter from a small fraction of a wavelength to about one wavelength is made possible can be utilized to synthesize phasor-difference amplitude patterns based on larger antenna-pair separations for improved direction-finding performance, selectively and nonselectively in direction. Directionally nonselective direction finding is provided by circular array arrangements with pairings of diametrically separated antennas. Directionally preferential direction finding is obtained with a circular array by pairing nondiametrically separated antennas, as shown solely for illustration in FIG. 2a). Directionally preferential direction finding can also be obtained by employing noncircular array arrangements, such as shown solely for illustration in FIG. 2b).

Attention will now be directed in this proposal to showing how to evolve new methods and apparatus for improving instrumental precision and performance accuracy in direction finding by means of Adcock-type arrays with circular apertures in excess of one wavelength, and by structuring the receiver for robust processing of Adcock-pair difference-signals. We start by reformulating the basic theory in order to a) show how both azimuth and elevation angle of arrival can be derived from the amplitudes of the Adcock-pair difference signals; and b) bring out the bases for, and the conditions under which, an Adcock-type antenna cluster can be effectively configured with apertures well in excess of one wavelength. The discussion is then directed to structuring the receiver to ensure instrumental stability and low associated systematic errors. Finally, the additional receiver functional-structural requirements are specified for application to signals of wide-band modulation characteristics, such as wide band-spreading FM, and direct-sequence and frequency-hopping spread spectrum.

Direction of arrival (or DOA) measurement by means of a 4-element Adcock cluster is based on the properties of the phasor difference between the outputs of diametrically separated Adcock-paired (henceforth, A-paired) vertically polarized antennas. These properties are brought out by first noting, with reference to FIGS. 1a), 2, that in response to an incident single-frequency sinusoid, $\cos \omega_c t$, the difference between the outputs of the N and S antennas, is given by $$E_s \cos \alpha \cos\{\omega_c t - (\pi D/\lambda_c)\cos\alpha\cos\theta\} \, (N \text{ output}) - \qquad (1)$$
$$E_s \cos \alpha \cos\{\omega_c t + (\pi D/\lambda_c)\cos\alpha\cos\theta\} - (S \text{ output}) =$$
$$2E_s\cos\alpha\sin\{(\pi D/\lambda_c)\cos\alpha\cos\theta\}\sin\omega_c t \equiv e_{NS}(t) \equiv E_s A_{NS}(\alpha, \theta)\sin\omega_c t$$

where, with reference to FIG. 1a), 2, $\alpha$=elevation angle of arrival of the incident wavefront, relative to the plane of the Adcock cluster $\theta$=Azimuth angle of arrival of the incident wavefront, relative to the N-S axis D=distance (diameter of cluster circle) between the two antennas $\lambda_c = (2\pi/\omega_c)c$=wavelength of incident wave $E_s$=Amplitude of signal out of each antenna when $\alpha$=0

Similarly, for the E and W antenna pair, $$e_{EW}(t) \equiv 2E_s\cos\alpha\sin\{(\pi D/\lambda_c)\cos\alpha\sin\theta\}\sin\omega_c t \qquad (2)$$
$$\equiv E_s A_{EW}(\alpha, \theta)\sin\omega_c t$$

In discussions of directional sensory characteristics, we shall refer to $A_{NS}(\alpha,\theta)$ and $A_{EW}(\alpha,\theta)$ as the N-S and E-W polar patterns of the Adcock cluster. In discussions of the signals out of the A-pairs, we shall refer to them as the direction-dependent amplitude (or DDA) factors.

Determination of bearing, or azimuth, angle is based on the fact that $$e_{EW}(t)/e_{NS}(t) = A_{EW}(\alpha,\theta)/A_{NS}(\alpha,\theta) = \tan \zeta \qquad (3)$$

where $\zeta$ is an "indicated angle" which, for a wavefront of wavelength, $\lambda$, incident at azimuth $\theta$ and elevation angle $\alpha$, is given by $$\tan\zeta = \frac{\sin\{(\pi D/\lambda)\cos\alpha\sin\theta\}}{\sin\{(\pi D/\lambda)\cos\alpha\cos\theta\}} \quad (4)$$

$$\cong \tan\theta, \quad \text{for } D/\lambda \le 1/4 \quad (5)$$

As for the elevation angle, $\alpha$, we formulate the expression $$\cos\gamma \equiv \frac{\sqrt{\sum(\text{Squares of Amplitudes of N-S \& E-W } \textit{Signals})}}{(2\pi D/\lambda)(\text{Amplitude of Output of One Antenna})} \quad (6)$$

$$\cong \cos\alpha, \quad \text{for } D/\lambda \le 1/4 \quad (7)$$

The differences $(\zeta-\theta)$ and $(\gamma-\alpha)$ represent "instrumental" errors in treating $\zeta$ as the azimuth angle $\theta$ and $\gamma$ as the elevation angle $\alpha$. These errors are called spacing errors, and limiting them, for a given number of antennas in the cluster (4, in the preceding derivations), requires that we limit the value of $D/\lambda$, the aperture of the cluster.

It should be noted that spacing errors, because of their systematic, fixed instrumental nature, can be calibrated out, at the cost of a storage requirement, provided they are limited to manageable levels by design. It will be shown, however, that the spacing errors can be reduced to negligible levels if the number of antennas in the cluster is made large enough, even for antenna spacing (cluster diameter) of several wavelengths, except for certain discrete values of antenna spacing at which the maximum mannitude of the spacing error is $\pi/2$ rad.

It is clear from the restriction antenna separation Eqs.(5) and (7) that the proper polar patterns for the two A-pair combinations in a 4-element cluster to ensure that $\zeta=\theta$ and $\gamma=\alpha$, are In azimuth, a $\cos\theta$ pattern, for the N-S sensor, and a $\sin\theta$ pattern for the E-W sensor;

In elevation angle, a $\cos^2\alpha$ pattern for both.

The $\cos\theta$ and $\sin\theta$ patterns are depicted each by a pair of tangentially touching circles forming a "figure-of-eight". Values of $D/\lambda$ in excess of ¼ cause very noticeable departures from the figure-of-eight shape. These departures cause $\zeta$ in Eq.(4) to become significantly different from $\theta$, and $\gamma$ in Eq.(6) to become significantly different from $\alpha$; and, hence, the interpretation of $\zeta$ as $\alpha$ in Eqs.(3) and (4), and of $\gamma$ as $\alpha$ in Eqs.(6) and (7), become subject to significant "spacing errors."

We state and demonstrate the following Theorem: Except for an infinite set of disallowed, discrete values of $D/\lambda$, it is possible to synthesize an $A_{NS}(\alpha,\theta,n)$ pattern and an $A_{EW}(\alpha,\theta,n)$ pattern from the n/2 A-pair outputs of n antennas arranged with uniform spacing around a circle of radius $D/\lambda$, such that $$\tan\zeta \equiv \frac{A_{EW}(\alpha,\theta,n)}{A_{NS}(\alpha,\theta,n)} \to \tan\theta \text{ as } n \to \infty \quad \text{and} \quad (8a)$$

$$\cos\gamma = \frac{\sqrt{A_{EW}^2(\alpha,\theta,n)+A_{NS}^2(\alpha,\theta,n)}}{(n/2)(\pi D/\lambda)(\text{Amplitude of Center Antenna Output})} \quad (8b)$$

$$\to \cos\alpha \text{ as } n \to \infty$$

It can be shown (Ref. 1) that if the differenced outputs of a sufficient number of diametrically opposite pairs of antennas are combined in a prescribed way, then, except for a sequence of forbidden discrete values of $D/\lambda$, we can synthesize two resultant signals described by $$e_{NS}(t) \cong (n/2)E_s(\pi D/\lambda)\{\cos^2\alpha\cos\theta\}\sin\omega_c t, \quad (9a)$$

Corresponding to a North-South diameter and $$e_{EW}(t) \cong (n/2)E_s(\pi D/\lambda)\{\cos^2\alpha\sin\theta\}\sin\omega_c t, \quad (10a)$$

Corresponding to an East-West diameter where n=(even) number of antennas around the perimeter of the circle If, further, an antenna is placed at the center of the circle, then its output will be $$e_O(t) = E_s \cos\alpha \cos\omega_c t \quad (11)$$

The method of synthesis is as as follows. With reference to FIG. 1a), consider a set of n(=even number) antennas arranged with uniform spacing around a circle of diameter $D/\lambda$. The E, N, W, and S positions are called the cardinal positions, and the N-S and E-W lines are called the cardinal axes. The addition of antennas at uniformly spaced off-cardinal positions on the perimeter enables sampling of the signal phase at mirror-image points about the N-S axis, and about the E-W axis. The steps for the synthesis are:

1. Designate the N end of the N-S axis as the reference North, and measure azimuth angle clockwise from that diameter;
2. Resolve the DDA patterns of the off-diagonal A-pairs into components along the cardinal N-S and E-W axes by Adding the differenced outputs of all off-cardinal A-pairs, to obtain the sum of their N-S components, and Subtracting the differenced outputs of the 2nd→4th-quadrant pairs from the differenced outputs of the 1st→3rd-quadrant pairs, to obtain the sum of their E-W components.

3. Define $$A_{NS}(\alpha,\theta,n) = (\text{All DDA's}) \quad (9b)$$

$$A_{EW}(\alpha,\theta,n) = \Sigma(E\text{-}W \text{ \& 1st}{\to}\text{3rd-Quadrant Pair DDA's}) - \Sigma(2\text{nd}{\to}\text{4th-Quadrant Pair DDA's}) \quad (10b)$$

The values of $D/\lambda$ for which the convergences stated in the theorem will occur are determined from the expression for the maximum spacing error in interpreting $\zeta$ as $\theta$. Let $$\varepsilon_{\theta,sp,\max} \equiv \text{Maximum Spacing Error in }\theta$$

$$= |\zeta-\theta|_{\max}$$

Then it can be shown {1} that, for $$0<\beta<\text{Value for First Peak of } J_{n-1}(\beta) \quad (12)$$

$$\tan\varepsilon_{\theta,sp,\max} \cong |J_{n-1}(\beta)/J_1(\beta)| \quad (13)$$

where $J_n(\beta)$ is the Bessel function of the first kind, n-th order and argument $\beta$, and $$\beta \equiv \pi(D/\lambda)\cos\alpha \quad (14)$$

$$= \pi D/\lambda, \quad \text{for }\alpha = 0$$

The convergences stated in the Theorem follow from the fact that the limit of the right-hand side of Eq.(13) as n goes to infinity is zero, except for values of $\beta$ at which $J_1(\beta)=0$; i.e.;

$$\tan\varepsilon_{\theta,sp,\max} \to 0 \text{ as } n\to\infty, \text{ for } J_1(\beta)=0$$

$J_{n-1}(\beta)$ is nonzero for all $\beta$ included in (12). (In any case, the zeros of $J_{n-1}(\beta)$ and $J_1(\beta)$ occur at different values of $\beta$.) At the zeros of $J_1(\beta)$, $$\varepsilon_{\theta,sp,\max} = \pi/2, \text{ independently of } n \quad (15)$$

Thus, the convergence of tan $\zeta$ to tan $\theta$ as $n \to \infty$ will not occur for values of $D/\lambda$ that correspond to the zeros of $J_1(\beta)$. For $\beta>0$, $J_1(\beta)=0$ at values of $\beta$ corresponding to $$D/\lambda = \beta/\pi \cong 1.22, 2.23, 3.24, 4.24, 5.24, 6.24, 7.25, 8.25, 9.25, 10.25, 11.25, \ldots \quad (16)$$

These values apply, of course, for $\alpha=0$, and in view of Eq.(14), will hold very approximately for $|\alpha|<0.45 \cong \pi/7$ rad. Otherwise, the values of $D/\lambda$ that must be excluded will shift upward as $\alpha \to \pi/2$.

The excluded point values of $D/\lambda$ a) Divide the range of useable values of D, for a given $\lambda$ (or its corresponding frequency), into subranges each of extent equal very nearly to $\lambda$; and b) Divide the frequency range for which acceptable DF performance is realizable, with a given D, into bands each of width approximately c/D Hz, where c is the velocity of propagation. For D=1 m, c/D=300 MHz.

In a practical design, the number of antennas is determined in light of Eq.(13) to satisfy a specified tolerance on $\epsilon_{\theta,sp,max} \ll 1$. Specifically, i) The value of $D/\lambda$ is chosen to fall within the desired allowed subrange, as close to a local peak of $|J_1(\beta)|$ as possible; and ii) The value of n is then chosen so that $J_{n-1}(\beta)$ is sufficiently small to satisfy the bound $$|J_{n-1}(\beta)/J_1(\beta)| \ll \epsilon_{\theta,sp,max} < 1 \quad (17)$$

For $D/\lambda<1.22$, the first range of allowable A-pairwise antenna spacing (for $\alpha<\pi/7$ rad), upper-bounded by the first nonzero zero of $J_1(\beta)$, the variation of the maximum allowable spacing, $D_{max}$, with the number, n, of antennas in the cluster, for the spacing error in azimuth not to exceed a specified value is monotonically increasing for vertically polarized wavefronts incident at zero elevation angle. As D approaches an excluded value, the spacing error, with n not sufficiently large, grows rapidly to the absolute maximum of $\pi/2$ rad. Upon reaching a forbidden separation the spacing error becomes independent of n, and a goniometer—type of bearing indicator (i.e., one that computes $\zeta$ and presents it as $\theta$) breaks down. The physical reason for this breakdown can be determined by examining the radial pattern for a single Adcock pair. DDA polar plots show that as $D/\lambda$ increases (either because D is increased for the same $\lambda$, or $\lambda$ is decreased for the same D) starting from a very small value, the pattern starts as very nearly two circles touching at the origin, develops dimples about $\theta=0$ and $\pi$ as $D/\lambda$ becomes greater than $\frac{1}{4}$, the dimples deepening down to nulls at $\theta=0$ and $\pi$ for $D/\lambda=1$, at which point each of the originally single lobes splits up into two lobes with the same phase. However, as $D/\lambda$ becomes greater than one, the DDA polar pattern plots as a function of $\theta$ show that new lobes with phase opposite to the others emerge about $\theta=0$ and $\pi$, which grow until for $D/\lambda=1.22$, these new lobes reach a level comparable with that of the two lobes resulting from the two nulls at $\theta=0$ and $\theta=\pi$. Thus, the pattern of each pair acquires deformities that cannot be compensated/repaired in combination with any number of other intermediate pairs.

For values of $\beta$ not restricted as in Eq.(12), $$\tan \epsilon_{\theta,sp,max} = |J_{n-1}(\beta)/\sqrt{J_1^2(\beta)-4\{J_n^1(\beta)\}^2}| \quad (18)$$

Based on this expression, values of $D/\lambda$ can be considered in subranges beyond those that fit below the right-side bound in Eq.(12). The cluster design guidelines for ensuring a wide aperture with a specified tolerance on spacing error become:

i) Choose a value of $D/\lambda$ in between zeros, and preferably near a peak of the magnitude, of $$J_1^2(\beta)-4\{J_n^1(\beta)\}^2 \quad (19)$$

ii) Choose n so that $J_{n-1}(\beta)$ is very near to, or at, one of its zeros for the chosen value of $D/\lambda$.

In Adcock-type differencing of phasor outputs of diametrically separated pairs of antennas, a $D/\lambda>1$ does not cause cyclic ambiguity because i) $A_{NS}(\alpha,\theta,n)$ and $A_{EW}(\alpha,\theta,n)$ are detected/measured as cyclically unambiguous amplitudes or voltages, unlike cyclically ambiguous phase differences; ii) Azimuth $\theta$ is a one-cycle angle; iii) Elevation angle $\alpha$ is a one-quarter-cycle angle.

A multi-$\lambda$ separation between antennas whose output phasor difference is taken will cause only the multilobing effect in the measured DDA's that we have sought to compensate for with "gap-filling" additional A-pairs.

However, a quadrantal ambiguity of bearing (azimuth) indication will arise in inverting tan $\zeta$. This ambiguity is resolved by means of a "sense signal" obtainable either a) by adding a centrally mounted "sense antenna" to the circularly arranged cluster; or b) by taking the sum of some or all individual antenna outputs as the "sense signal." In either way, the sense signal derived establishes a reference phase that corresponds to the physical center of the cluster circle.

The quadrantal ambiguity in $\tan^{-1}(\ldots)$ is resolved in effect by employing the sense signal as the carrier phase reference for deriving (by product demodulation, direct or in an APC demodulator) the direction-dependent amplitudes (DDA's) of the composite N-S and E-W signals. The polarities of the DDA output voltages are determined by the phases of the A-pair output signals relative to the $\pi/2$-phase-shifted sense signal. These polarities, of course, resolve the quadrantal ambiguity.

Figure 1B:
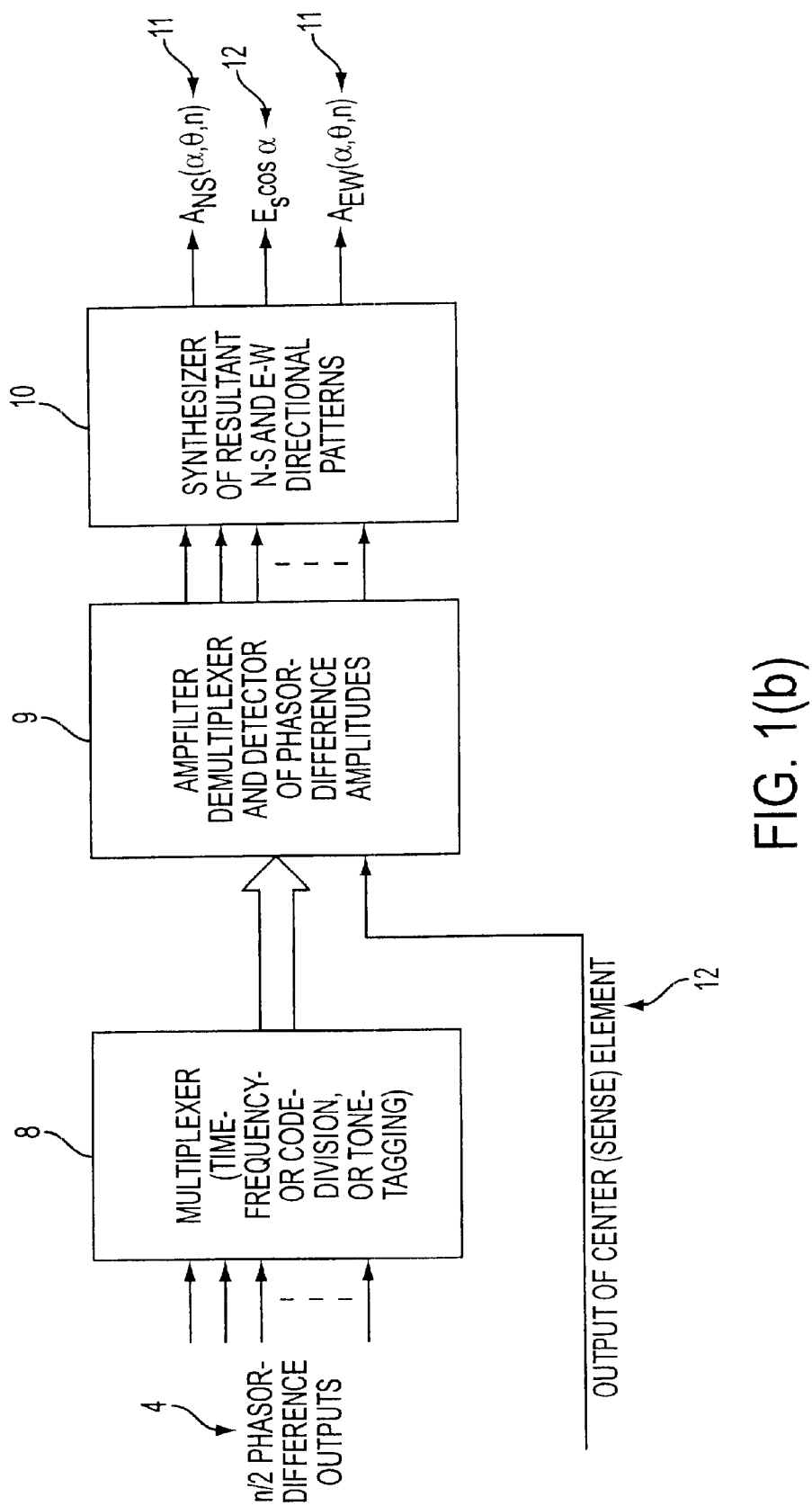

The various outputs of the n/2 A-pairs of an n-antenna cluster may be processed separately in an (n/2)-channel receiver; or they may be multiplexed in some manner so that they may be processed in a single-channel receiver; or they may be operated on by passive circuitry in the front-end to derive (in Block 5, FIG. 1a))

$$A_{NS}(\alpha,\theta,n)\sin \omega_c t, \; A_{EW}(\alpha,\theta,n)\sin \omega_c t$$

and the sense signal, $E_s \cos \alpha \cos \omega_c t$ \quad (20)

which can then be processed either through a 3-channel receiver, or through a multiplexer followed by a single-channel receiver (Blocks 8 and 9, FIG. 1b).

The problems of ensuring identical, separate receiver channels are practically eliminated by frequency multiplexing the various DDA-carrying signals in Block 8, FIG. 1b), within a very narrow bandwidth of a single-channel receiver, or by switching the input of such a receiver between the various DDA-carrying signals, in Block 8 of FIG. 1b).

In the variations, such as exemplified in FIG. 2, on the choice of relative positions of elements that are A-paired around the array perimeter 7, as well as of shape 7 of perimeter, the relative orientation angles $\pm\beta_1, \pm\beta_2, \ldots$, are chosen so that the major lobes of the DDA's within the directional sector of interest centered about the orientation of the axis A–B combine to shore up one another's falling skirts. The directional preference can be steered in the example of FIG. 2a) by moving the role of the one "focal" antenna, A, that is common to all pairs, to other antenna positions around the perimeter. Other embodiments of this invention which illustrate alternative A-pair focalization arrangements are shown in FIGS. 2c) and d).

Figure 3A:
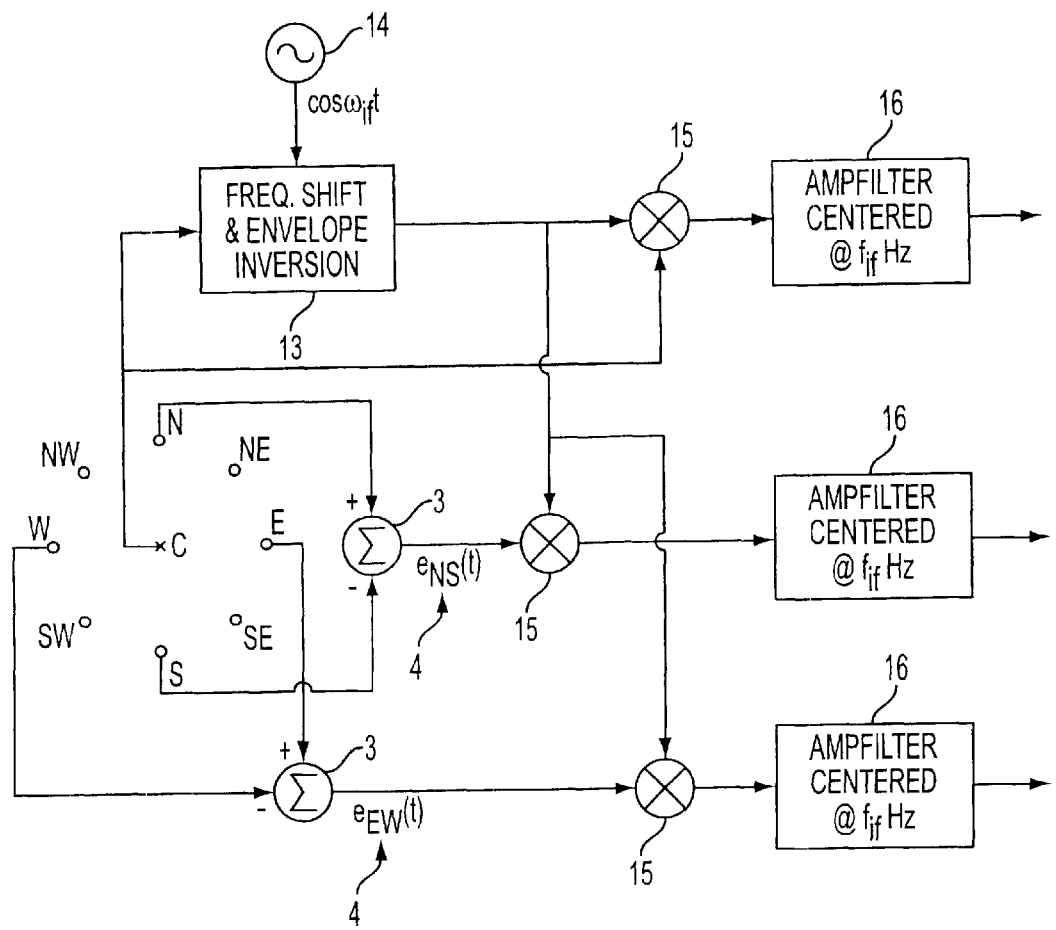
FIG. 3 illustrates the use of the sense antenna output to effect spectrum-despreading of a spectrally spread incident signal down to a single-frequency, filter-separable component, in accordance with this invention.

The preceding analyses were predicated on the incident signal containing an isolated, filter-separable single-frequency component. The simplest way to extend the results to a modulated signal that does not offer such a component on arrival is to start by "dismodulating" the signal; i.e., suppressing the modulation to restore a filter-separable, single-frequency "sinusoidal carrier" component, which may also be described as despreading the incident-signal spectrum down to a single-frequency carrier. It is preferred that this signal dismodulation or spectrum-despreading process be effected at the earliest convenient reception stage. A sense antenna, C, would greatly facilitate this process by providing the dismodulating signal. The output of a sense antenna is applied as is in the manner illustrated in the embodiment of this invention shown in FIG. 3a)for constant-envelope signals. With reference to FIG. 3a), the sense antenna, C, output is first frequency-shifted by means of Frequency Shifter 13 by a fixed amount $f_{if}$ determined by Oscillator 14, and then applied to Multipliers 15 to multiply each of the A-pair phasor-difference outputs 4 of Phasor-Differencers 3. The frequency-difference component of each of the resulting products will be stripped of any phase or frequency modulation, and will appear in the output of the corresponding Ampfilter 16 as a single-frequency sinewave with amplitude proportional to the DDA of the phasor-difference signal 4, multiplied by cos α. This phase or frequency modulation wipeoff process may alternatively be applied to the ouput of each of the individual antennas in the array 1, or to each of the phasor-difference signals 4 after each has been operated on to be committed to a sub-channel slot (in frequency, time, code, tone, or other), before or after the sub-channels are combined to yield the multiplexed combination.

As for a single-frequency sense-antenna signal 7 (FIGS. 1 and 3), the sense-antenna output may be operated on separately by a Sense-Signal Modulation Suppressor 17, which employs techniques described in U.S. Pat. No. 4,513,249 and/or other coded-spread-spectrum despreading techniques. Alternatively, a combination of some or all of the dismodulated DDA-carrying signals may be combined to synthesize a single-frequency sense signal.

Combined AM and FM signals may be dismodulated by using the techniques of U.S. Pat. No. 4,513,249. In such a case, the sense-antenna output is first converted into a "modulation wipeoff auxiliary signal," namely one whose envelope is the reciprocal of the envelope of the incident signal, and whose instantaneous frequency is $f_{if}$ plus the instantaneous frequency of the incident signal. The modulation wipeoff auxiliary signal is then applied to Multipliers 15 to multiply each of the A-pair phasor-difference outputs 4.

Figure 2A:
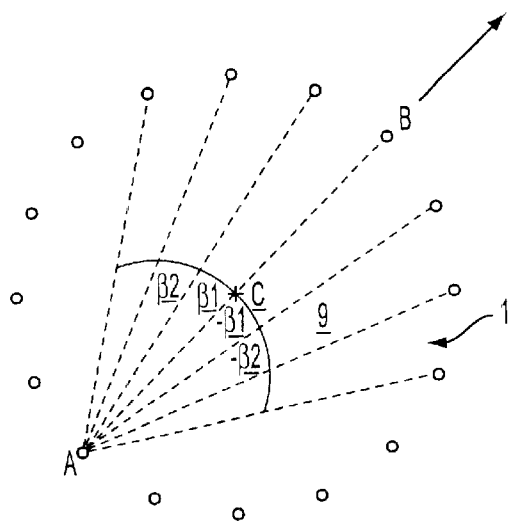
FIG. 2 illustrates a number of alternative array configurations and antenna pairing arrangements for effecting increased sensor array aperture in a particular preferred direction angle sector, in accordance with this invention.
Figure 2B:
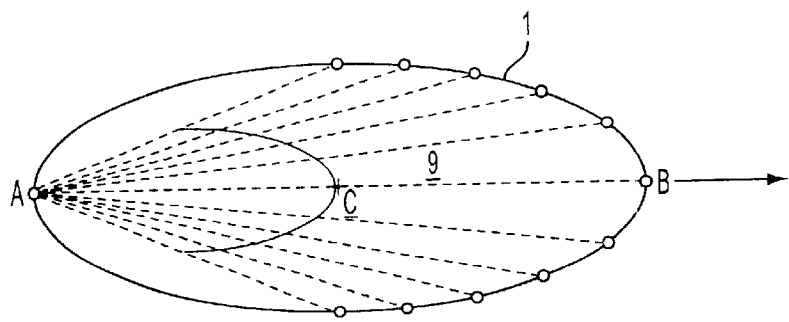
Figure 2C:
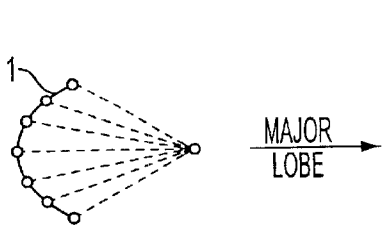
Figure 2D:
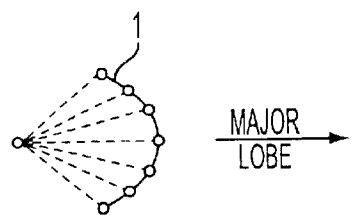
Figure 2E:
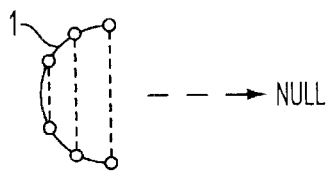
Figure 3B:
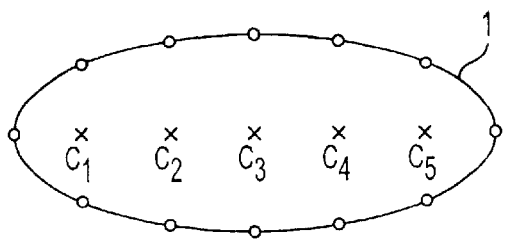

In noncircular arrangements, as for examples 1 in FIGS. 1b), c), d) and e), and FIG. 3b),each A-pair may be provided with a separate sense antenna placed at mid-point ($C_1$, $C_2$,... in FIG. 3b), loci 9 in FIGS. 2a) and b)) between their positions.

REFERENCE

1. Redgment, P. G., Struszynski, W., and Phillips, G. J., "An Analysis of the Perfromance of Multi-Aerial Adcock Direction-Finding Systems," Journal of IEE, vol. 94, Part III A, pp. 751–761; 1947.

While there has been described what is at present considered to be representative embodiments of the invention, it will be obvious to those skilled in the art that various changes and modifications may be made therein without departing from the invention, and it is aimed in the appended claims to cover all such changes and modifications as fall within the true spirit and scope of the invention.

For clarity in the statements of the appended claims, the following definitions of terms are provided:

Adcock array is characterized by four features: a) Circular, with or without a center element usually called a sense element; b) Uniformly spaced elements along perimeter of circle; c)Total, or phasor, of outputs of diametrically separated elements are subtracted one from the other, resulting in phasor-difference outputs; d)Diameter of circle is less than 1.22 times the shortest wavelength for which the array is designed.

Adcock-array way, is one characterized by a), b) and c) only.

Inverting envelope waveform means transforming a combined envelope and exponent (phase or frequency) modulated signal represented by $V(t)\cos\{\omega_c t+\psi(t)\}$ to $\{1/V(t)\}\cdot\cos\{\omega_c t+\psi(t)\}$. The latter,shifted $f_{if}$ Hz, is called "auxiliary modulation-wipeoff signal".

Diametrically separated means positioned at the ends of the same diameter of a circle.

Focal element is an element whose output is subtracted from the outputs of more than one element of an array.

Conic section means circle, or ellipse, or parabola, or hyperbola.

Matricial means arranged in the form of a matrix, including a straight line (a row or column matrix) and more generally an m×n array (rectangular, triangular, square, etc.).

What is claimed is:

1. A method of determining the direction of arrival of a traveling spectrally spread signal wavefront of measurable center-frequency wavelength, comprising the steps of:

employing an array of signal-sensing elements;

taking the differences between the outputs of pairs of spaced elements;

taking the output of a single element and shifting it in frequency by an amount $f_{if}$ Hz and inverting its instantaneous envelope waveform;

multiplying each of said differences between outputs by said frequency-shifted, inverted-envelope single-element output, and selecting the product components at $f_{if}$ Hz;

detecting the amplitude of each of said product components at $f_{if}$ Hz; and determining said direction of arrival from detected amplitudes of said product components.

2. A method of determining the direction of arrival of a traveling spectrally spread signal wavefront of measurable center-frequency wavelength, comprising the steps of employing an array of signal-sensing elements;

taking the output of a single element and shifting it in frequency by an amount $f_{if}$ Hz, and inverting its instantaneous envelope waveform;

multiplying the output of each element of said array of signal-sensing elements by said frequency-shifted, inverted-envelope single-element output, and selecting the product components at $f_{if}$ Hz;

taking the phasor difference between pairs of said product components at $f_{if}$ Hz;

detecting the amplitude of each of said phasor-differences; and determining said direction of arrival from the detected amplitudes of said phasor-differences.

3. The method of claim 1, wherein $f_{if}=0$ Hz.

4. The method of claim 2, wherein $f_{if}=0$ Hz.

5. An apparatus for determining the direction of arrival of a traveling spectrally spread signal wavefront of measurable center-frequency wavelength, comprising:

an array of signal-sensing elements;

means for taking the differences between the outputs of pairs of spaced elements;

means for taking the output of a single element and shifting it in frequency by an amount $f_{if}$ Hz and inverting its instantaneous envelope waveform resulting in an auxiliary modulation-wipeoff signal;

means for multiplying each of said differences between outputs by said auxiliary-modulation-wipeoff signal, and selecting the product component at $f_{if}$ Hz;

means for detecting the amplitude of each of said product components at $f_{if}$ Hz; and means for determining said direction of arrival from detected amplitudes of said product components.

6. An apparatus for determining the direction of arrival of a traveling spectral spread signal wavefront of measurable center-frequency wavelength, comprising an array of signal-sensing elements;

means for taking the output of a single element and shifting it in frequency by an amount $f_{if}$ Hz, and inverting its instantaneous envelope waveform, resulting in auxiliary modulation-wipeoff signal;

means for multiplying the output of each element of said array by said auxiliary modulation-wipeoff signal, and selecting the product component at $f_{if}$ Hz;

means for taking the phasor-differences between pairs of said product components at $f_{if}$ Hz;

means for detecting the amplitude of each of said phasor-differences; and means for determining said direction of arrival from the detected amplitudes of said phasor-differences.

7. The apparatus of claim 5, wherein $f_{if}=0$ Hz.

8. The apparatus of claim 6, wherein $f_{if}=0$ Hz.

9. An apparatus for determining the direction of arrival of a traveling spectrally spread signal wavefront of measurable center-frequency wavelength, comprising;

an array of signal-sensing elements;

means for taking the output of a single element and shifting it in frequency by an amount $f_{if}$ Hz, and inverting its instantaneous envelope waveform, resulting in an auxiliary modulation-wipeoff signal;

means for multiplying the output of each element of said array by said auxiliary-modulation-wipeoff signal, and selecting the product component at $f_{if}$ Hz;

means for detecting the phase differences between par of said product components at $f_{if}$ Hz; and means for determining said direction of arrival from said detected phase differences.

10. An apparatus for determining the direction of arrival of a traveling spectrally spread signal wavefront of measurable center-frequency wavelength, comprising an array of signal-sensing elements;

means for taking the output of a single element and shifting it in frequency by an amount $f_{if}$ Hz, and inverting its instantaneous envelope waveform, resulting in auxiliary modulation-wipeoff signal;

means for multiplying the output of each element of said array by said auxiliary modulation-wipeoff signal, and selecting the product component at $f_{if}$ Hz;

means for taking the phasor-differences between pairs of said product components at $f_{if}$ Hz;

means for detecting the phase differences between pairs of said product components at $f_{if}$ Hz;

means for detecting the amplitude of each of said phasor-differences; and means for determining said direction of arrival from the detected phase differences and phasor-difference amplitudes.

11. The method of claim 1, wherein said step of inverting includes transforming said output of said single element, represented by V(t), to 1/V(t).

12. The method of claim 5, wherein said inverting means transforms said output of said single element, represented by V(t), to 1/V(t).

13. The method of claim 9, wherein said inverting means transforms said output of said single element, represented by V(t), to 1/V(t).

* * * * *